Figure 1:
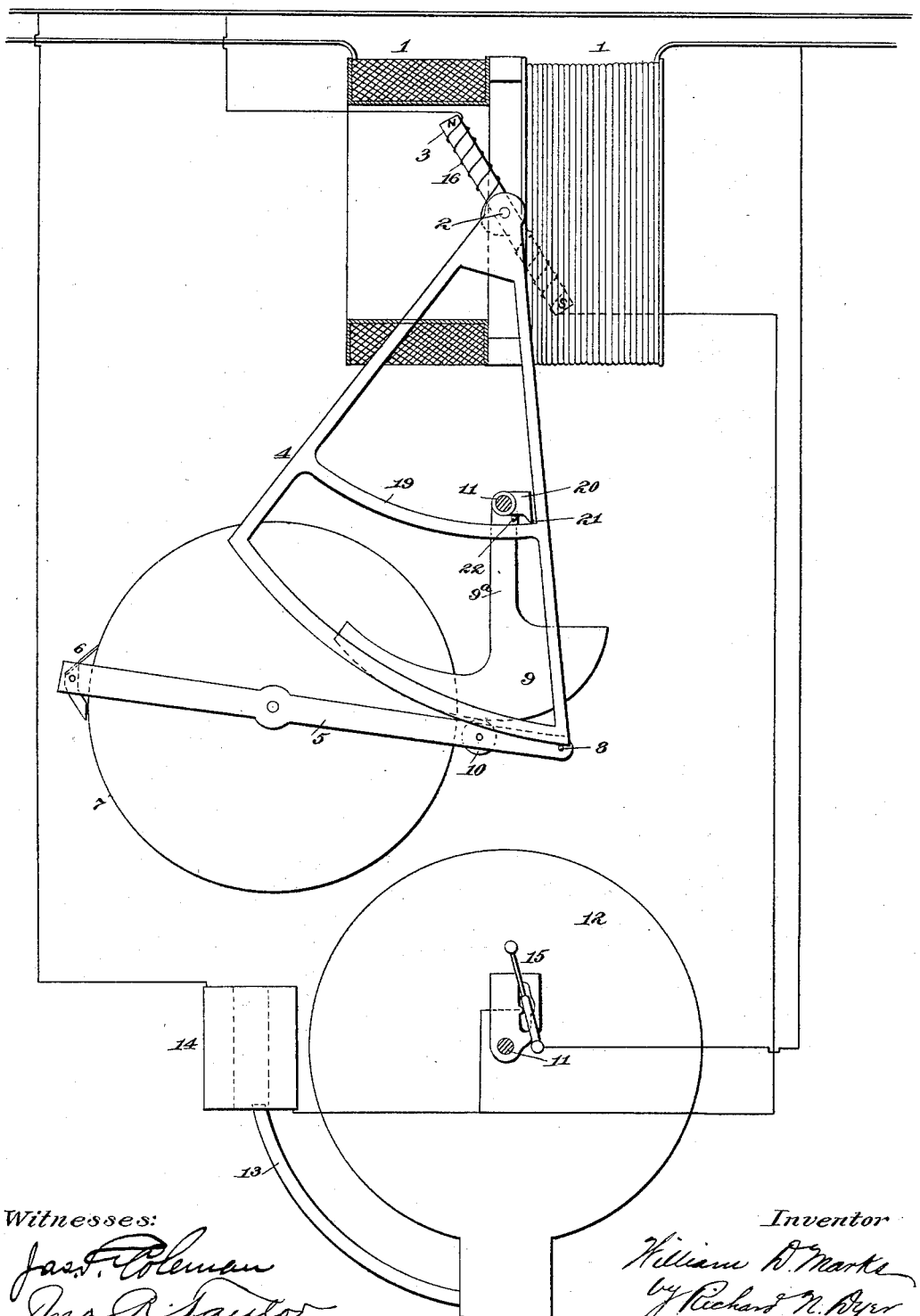

No. 612,781. Patented Oct. 18, 1898.
W. D. MARKS.
ELECTRIC METER OR INDICATOR.
(Application filed Feb. 7, 1898.)
(No Model.) 3 Sheets—Sheet 2.

Witnesses:

Inventor
William D. Marks
by Richard N. Dyer
Atty.

No. 612,781. Patented Oct. 18, 1898.
W. D. MARKS.
ELECTRIC METER OR INDICATOR.
(Application filed Feb. 7, 1898.)
(No Model.) 3 Sheets—Sheet 3.
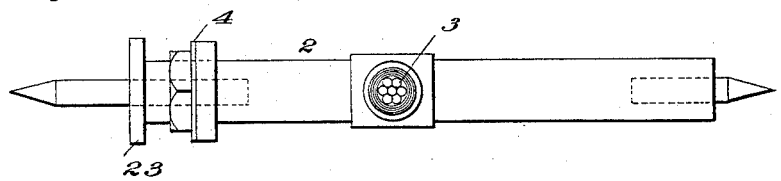
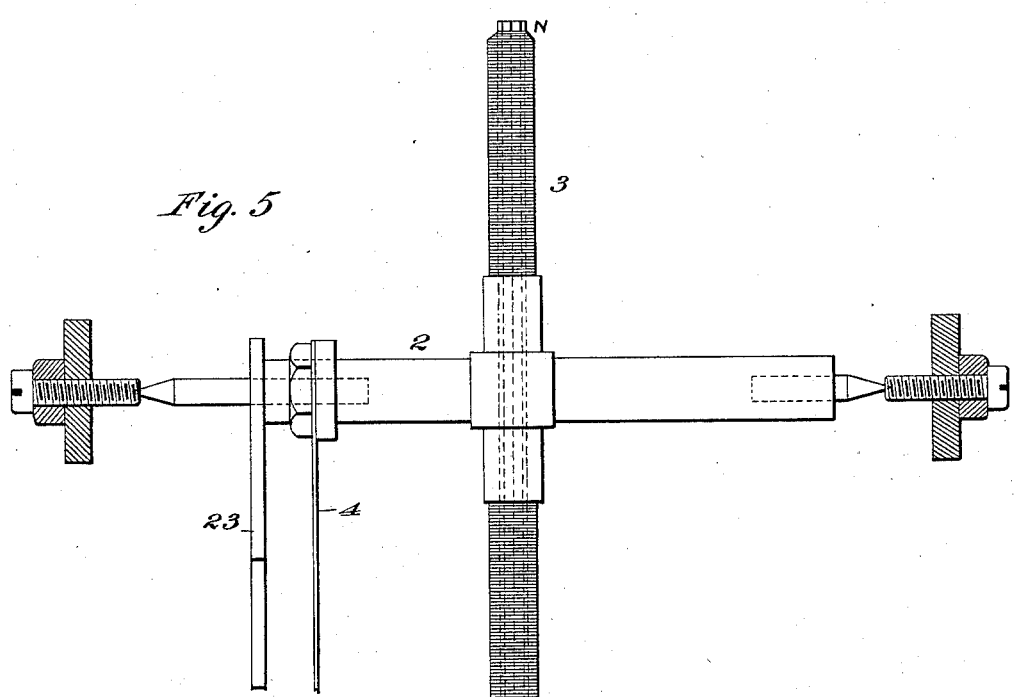
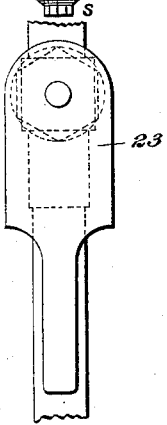
Witnesses:
Jas. F. Coleman
Jno. R. Taylor
Inventor
William D. Marks
by Richard N. Dyer
Att'y.

UNITED STATES PATENT OFFICE.

WILLIAM D. MARKS, OF PHILADELPHIA, PENNSYLVANIA, ASSIGNOR TO THE AMERICAN ELECTRIC METER COMPANY, OF SAME PLACE.

ELECTRIC METER OR INDICATOR.

SPECIFICATION forming part of Letters Patent No. 612,781, dated October 18, 1898.

Application filed February 7, 1898. Serial No. 669,342. (No model.)

*To all whom it may concern:*

Be it known that I, WILLIAM D. MARKS, a citizen of the United States, residing at Philadelphia, in the county of Philadelphia and State of Pennsylvania, have invented a certain new and useful Improvement in Electric Meters or Indicators, of which the following is a specification.

In Letters Patent No. 586,559, dated July 20, 1897, I describe an improved electrical meter employing an ampere-indicator for determining the position of a controlling-arch, said arch coöperating with a chrono-electric motor to cause a registering device to be operated at a rate dependent upon the position of said arch. In experimenting with meters of that type I discovered that all iron, however pure, has more or less magnetic lag, by reason of which a soft-iron core, vane, ring, needle, or other movable element suspended within or actuated by solenoids or other windings and forming an ampere-indicator would result in incorrect indication or registration in the meter or indicator. I therefore proposed in the said patent to employ an additional winding through which the current would flow in either direction and which would produce a polarization of the movable element, whereby this magnetic lag would be overcome.

It is the purpose of my present invention to improve the device described and claimed in said patent. With the construction described in said patent magnetic lag was largely reduced, although when relatively little current was influencing the ampere-indicator coils the core thereof would still, though to a less extent than theretofore, be insufficiently moved by the effect of such currents. Furthermore, when an additional winding was used on a soft-iron core, as described in said patent, such core might become slightly permanently magnetized, which residual magnetism would be augmented by the effect of the additional winding in the operation. If while in this condition the connections to the additional winding were reversed, as might happen through carelessness or ignorance, the slight residual magnetism in the core would oppose the magnetic effect produced in the coil, and in consequence the ampere-indicator would incorrectly indicate the load. In experimenting with ampere-indicators intended to overcome these objections I directed my attention to steel needles and steel cores which were permanently and strongly magnetized and which were used as the movable element of the ampere-indicator. I found that permanently and strongly magnetized needles or cores were extremely sensitive to small loads and that there was practically no lag. I discovered, however, that a powerfully and permanently magnetized needle or core would not be suitable or practicable for the purpose, because of the fact that the magnetism becomes gradually weakened, and, further, because in the event of a sudden jar or shock to such a core or needle the magnetism thereof might be entirely dissipated.

I have discovered if a single bar of steel or a steel needle or a number of small bars of steel, such as a bunch of knitting-needles, be tempered glass-hard and permanently magnetized and be provided with a coil extending over the entire length of the magnet thus produced that all leakage of magnetism is done away with, that any magnetism lost by a sudden shock is immediately restored, and that when used in connection with an ampere-indicator in an electric meter or elsewhere it will be sensitive to the smallest loads and at the same time absolutely accurate in its actions at all points of the load. The coil thus provided on the permanently-magnetized core, needle, or other movable element of the ampere-indicator may, when used in an electric meter of the type referred to, be connected in the circuit with the circuit-breaker, so as to be influenced by an interrupted current. With such an ampere-indicator I have found that when used in an electric meter the movable element thereof is not affected or its strength deteriorated by any accidental short circuits which may strain the mechanism of the meter. I have furthermore found that while in the operation of the indicator the coil or winding on the core or other movable element thereof when properly connected supplements the permanent magnetism, yet if the current through the coil or winding is accidentally reversed the effect of the coil will simply neutralize the permanent magnetism, so that the indicator will not operate, whereby a positive indication is given that an improper connection has been made. I thus obtain a device wherein incorrect registration is impossible, since if the connections are not correct the indicator will fail to be affected by the currents.

Preferably I use my present improvement in connection with an electric meter such as I have before referred to, although it is capable of other uses to which ampere-indicators may now be applied. When employed in connection with such a meter, the additional winding or coil on the core, needle, or other movable element of the ampere-indicator is, as stated, connected in circuit with a circuit-breaker. Such circuit-breaker is ordinarily arranged to close the circuit through the chrono-electric motor at the commencement of the attracted swing of the pendulum and to break the circuit near the end of the attracted swing, and holds the circuit open during the unattracted swing. The pendulum of the motor during the unattracted swing drives the register to an extent proportional to the current passing through the ampere-indicator. The advantage derived in using my improved indicator with a meter possessing these functions is that the additional coil or winding on the core, needle, or other movable element of the ampere-indicator will be excited only during that movement of the pendulum which does not result in the driving of the register, and therefore the rate of registration will not be affected by this extra excitation.

When the additional winding or coil is connected through the automatic circuit-breaker, it is desirable to employ a dead-beat device for the controlling-arch, as described in Letters Patent No. 586,560, dated July 20, 1897, to prevent false registration due to movements of the arch under the influence of the additional winding. Such a device also guards against false registration due to sudden fluctuations in the amount of current flowing through the ampere-indicator during the operative stroke of the driving device of the register. In this connection I have devised an improved form of dead-beat device which is operated by or in connection with the driving-cam. It is well known that in meters of the type herein referred to the driving-cam of the register is provided with a concentric edge which engages with the driving pawl-lever at the end of each effective stroke of the driving-cam and that during that period the pawl-lever is not moved by the driving-cam. My improved dead-beat device is so arranged that it will be released through the movement of the driving-cam during the period of engagement between the concentric portion of the cam and the pawl-lever, so that the controlling-arch may be adjusted to the amount of current being consumed after each effective stroke of the driving-cam and before the circuit to the additional winding is again closed.

While, as stated, it is considered preferable to arrange the additional coil or winding with the core, needle, or other movable element of the ampere-indicator in the circuit with the circuit-breaker of the meter, it is possible to place said additional coil or winding in a shunt across the line, so that it will be permanently magnetized.

In order that my invention may be better understood, attention is directed to the accompanying drawings, forming a part of this specification, and in which—

Figure 2:
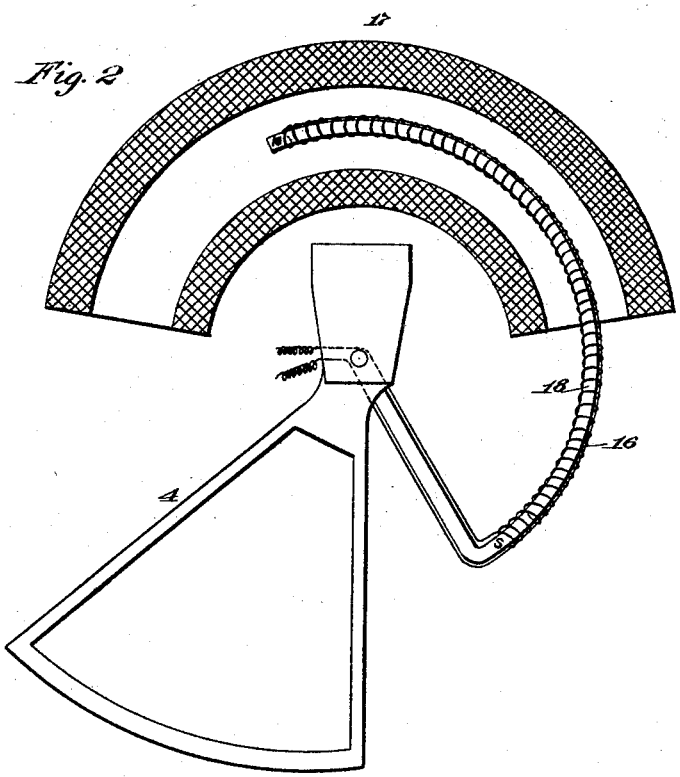
Figure 3:
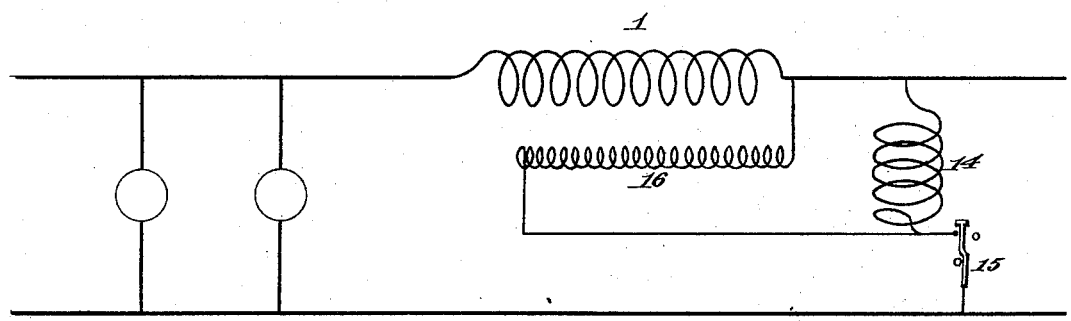

Figure 1 is a diagrammatic view of the main operative parts of an electric meter of the type referred to, showing an ampere-indicator comprising two flat coils with a coöperating pivoted needle, one of said coils being shown in section; Fig. 2, a similar view illustrating a different form of ampere-indicator employing my present improvements; Fig. 3, a similar view showing the circuits of the meter shown in Fig. 1, and Figs. 4, 5, and 6 detail views illustrating the preferable construction of and means for mounting the ampere-indicator needle or core.

In all of the above views corresponding parts are represented by the same figures of reference.

1 1, Fig. 1, represent two flat coils arranged end to end and connected in series in one side of the circuit, as customary.

2 represents a shaft mounted between these coils, preferably on pivot or antifriction bearings, and which carries a needle 3. The coils 1 and coöperating needle 3 constitute a well-known type of ampere-indicator, the needle 3 approaching toward a horizontal position under the effect of current influencing the coils 1. Suspended from the shaft 2 is a controlling-arch 4, having an eccentric lower edge. The said arch is preferably carried on the shaft 2 by a friction-sleeve, which tightly fits the latter, as shown in Figs. 4, 5, and 6. When, therefore, the shaft 2 is partially rotated under the effect of the current in the coils 1, the arch will be moved accordingly. It will be understood that the arch may be secured to the shaft 2 in other ways than by a friction-sleeve; but for the reason to be explained hereinafter I consider the latter arrangement to be preferable.

5 represents a pivoted lever carrying a pawl 6 at one end, which coöperates with a ratchet-wheel 7 of a register, and at the other end is provided with a pin 8, which strikes against the eccentric working face of the controlling-arch 4 in one direction of movement. The said lever is moved away from said arch by means of the driving-cam 9, working against a roller 10, said cam being carried on a main driving-shaft 11. In the form of meter shown said driving-shaft passes directly through the arch, and the cam 9 depends therefrom, being arranged immediately behind the said arch. The driving-shaft 11 is periodically oscillated in any suitable way, such as by a chrono-electric motor, which may comprise a disk pendulum 12, carried by said shaft, said pendulum being provided with a core 13, which is attracted by a solenoid or coil 14. The said coil or solenoid is connected in a shunt across the line, as shown in Fig. 3, and in said shunt is a circuit-breaker 15, carried also by the shaft 11 and which periodically makes and breaks the circuit to said solenoid or coil 14, as will be understood, thereby producing a constant oscillation of the shaft 11.

The core or needle 3 of the ampere-indicator is made of a steel bar, as shown in Fig. 1, or of a plurality of steel bars extending parallel to each other, as shown in Fig. 5, which bar or bars will be tempered glass-hard and powerfully and permanently magnetized. I have represented the needle or core 3 as being thus permanently magnetized by indicating the permanent magnetic fields by the letters N and S. Carried upon the needle or core 3 is a coil or winding 16, extending, preferably, substantially the entire length of the core or needle, and which coil or winding is preferably in a separate shunt-circuit across the line, but in series with the circuit-breaker 15, as shown in Fig. 3, whereby the said coil or winding 16 will be affected by an intermittent current.

In Fig. 2 I illustrate an ampere-indicator comprising a curved solenoid 17, with which coöperates a curved core 18 in the usual way. The core 18 is also permanently magnetized and is provided with the additional coil or winding 16 thereon, as I have described.

It will be obvious that the present invention can be carried out in connection with all forms of ampere-indicators wherein a coil is used influencing or determining the position of a movable element, in which case the movable element will be permanently and powerfully magnetized and will be provided with an extra coil or winding thereon, as I have explained.

The dead-beat device I have illustrated in Fig. 1 in its simplest form—i. e., a weighted knife-edge engaging with a concentric arc on the controlling-arch and arranged to be disengaged by a pin on the arm of the driving-cam. The weight 20, having a knife-edge 21, is loosely mounted upon the pendulum-shaft 11 and engages with the concentric arc 19, so as to lock the controlling-arch against movement. The arm 9ª of the driving-cam 9, which is keyed to the shaft 11, carries a pin 22, which is located so as to strike the weight 20 and lift it during the period of engagement between the concentric part of the driving-cam and roller 10, so that the controlling-arch will be released and permitted to adjust itself to the amount of current being consumed while the register is not being driven by the motor.

On the return stroke or actuated swing of the pendulum the pin 22 is moved out of engagement with weight 20, and the controlling-arch is again locked before the circuit-controller closes the motor-circuit and the circuit to the additional winding. Thus it will be seen that the additional winding in no way affects the rate of registration and that the controlling-arch is adjusted only by and in proportion to the current consumed beyond the meter.

In order to provide for very delicate calibration of the controlling-arch with respect to the ampere-core, I provide the shaft 2 with a short adjusting-arm 23, permanently affixed thereto and by means of which the said shaft (and the core also) may be moved slightly, the arch being held against movement. By this means the desired relative position of the arch to the core will be effected.

Having now described my invention, what I claim as new, and desire to secure by Letters Patent, is as follows:

1. In an ampere-indicator, the combination with the actuating coil or coils, of a permanently-magnetized movable member and an extra winding or coil on said movable member, substantially as set forth.

2. In an ampere-indicator, the combination with the actuating coil or coils, of a permanently-magnetized movable member and a coil or coils on said movable member of sufficient capacity to neutralize the permanent magnetism, substantially as set forth.

3. In an electric meter, the combination with an ampere-indicator comprising the actuating coil or coils, the permanently-magnetized movable member and the additional coil or winding for said movable member, of means coöperating with said ampere-indicator for registering the current influencing the same, substantially as set forth.

4. In an electric meter, the combination with an ampere-indicator comprising the actuating coil or coils, the permanently-magnetized movable member and the additional coil or winding for said movable member, of means coöperating with said ampere-indicator for registering the current influencing the same, and means for periodically energizing said additional coil or winding, substantially as set forth.

5. In an electric meter, the combination with an ampere-indicator comprising the actuating coil or coils, the permanently-magnetized movable member and the additional coil or winding thereon, of a controlling-arch the position of which is determined by said ampere-indicator, a pawl-carrying lever coöperating with said arch, and a chrono-electric motor for oscillating said pawl-carrying lever, substantially as set forth.

6. In an electric meter, the combination with an ampere-indicator comprising the actuating coil or coils, the permanently-magnetized movable member and the additional coil or winding for said movable member, of a circuit-breaker in circuit with said additional coil or winding and adapted to periodically energize and deënergize the same, and means for periodically locking the movable member, substantially as set forth.

7. In an electric meter, the combination with an ampere-indicator comprising the actuating coil or coils, the permanently-magnetized movable member and the additional coil or winding for said movable member, of a circuit-breaker in circuit with said additional coil or winding and adapted to periodically energize and deënergize the same, and a pivoted device for periodically locking the movable member, substantially as set forth.

8. In an electric meter, the combination with an ampere-indicator comprising the actuating coil or coils, the permanently-magnetized movable member and the additional coil or winding for said movable member, of a circuit-breaker in circuit with said additional coil or winding and adapted to periodically energize and deënergize the same, and a device movable out of and into locking position while said circuit-breaker is open, and whereby the movable member is held against movement while the circuit to said additional winding is closed by said circuit-breaker, substantially as set forth.

9. In an electric meter, the combination with an ampere-indicator comprising the actuating coil or coils, the permanently-magnetized movable member and the additional coil or winding for said movable member, of a circuit-breaker in circuit with said additional coil or winding and adapted to periodically energize and deënergize the same, a device movable out of and into locking position while said circuit-breaker is open, and whereby the movable member is held against movement while the circuit to said additional winding is closed by said circuit-breaker, and a chrono-electric motor for actuating said circuit-breaker and locking device, substantially as set forth.

10. In an electric meter, the combination with an ampere-indicator comprising the actuating coil or coils, the permanently-magnetized movable member and the additional coil or winding for said movable member, of a circuit-breaker in circuit with said additional coil or winding and adapted to periodically energize and deënergize the same, a device movable out of and into locking position while said circuit-breaker is open, and whereby the movable member is held against movement while the circuit to said additional winding is closed by said circuit-breaker, a chrono-electric motor for actuating said circuit-breaker and locking device, and a register periodically driven by said motor, substantially as set forth.

11. In an ampere-indicator, the combination with the actuating coil or coils, of a movable member actuated by said coil or coils, and a controlling-arch frictionally connected to said movable member, substantially as set forth.

12. In an ampere-indicator, the combination with the actuating coil or coils, of a movable member actuated by said coil or coils, a controlling-arch frictionally connected to said movable member, and an adjusting-arm connected to said movable member, substantially as set forth.

This specification signed and witnessed this 28th day of January, 1898.

WM. D. MARKS.

Witnesses:
JOHN H. HUDSON,
GEORGE W. RUE.